(12) United States Patent
Clifton et al.

(10) Patent No.: US 11,673,563 B2
(45) Date of Patent: Jun. 13, 2023

(54) OPERATIONAL MODES FOR A REFUSE VEHICLE

(71) Applicant: Oshkosh Corporation, Oshkosh, WI (US)

(72) Inventors: Cody Clifton, Mapleton, MN (US); Jerry Shirley, Oshkosh, WI (US); Josh Rocholl, Rochester, MN (US); Zhenyi Wei, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 414 days.

(21) Appl. No.: 16/851,196

(22) Filed: Apr. 17, 2020

(65) Prior Publication Data

US 2020/0346657 A1 Nov. 5, 2020

Related U.S. Application Data

(60) Provisional application No. 62/840,974, filed on Apr. 30, 2019.

(51) Int. Cl.
*B60W 50/00* (2006.01)
*G06F 3/04847* (2022.01)
(Continued)

(52) U.S. Cl.
CPC ........... *B60W 50/0098* (2013.01); *B60P 1/50* (2013.01); *B62D 21/02* (2013.01); *B62D 33/04* (2013.01); *E05F 15/70* (2015.01); *G06F 3/0482* (2013.01); *G06F 3/04817* (2013.01); *G06F 3/04847* (2013.01); *E05Y 2400/45* (2013.01); *E05Y 2900/518* (2013.01)

(58) Field of Classification Search
CPC ...... B60W 50/0098; B60P 1/50; B62D 21/02; B62D 33/04; E05F 15/70; G06F 3/04817; G06F 3/0482; G06F 3/04847; E05Y 2400/45; E05Y 2900/518; B65F 3/04; B65F 3/00
USPC .......................................................... 701/49
See application file for complete search history.

(56) References Cited

U.S. PATENT DOCUMENTS 5,222,853 A 6/1993 Carson
5,681,140 A 10/1997 Christenson
(Continued)

FOREIGN PATENT DOCUMENTS

DE 4402445 A1 * 8/1995 ............ B65F 3/0213
EP 2 803 604 A1 11/2014
(Continued)

OTHER PUBLICATIONS

Maroney et al. U.S. Appl. No. 62/837,576, filed Apr. 23, 2019.*

*Primary Examiner* — Muhammad Shafi
(74) *Attorney, Agent, or Firm* — Foley & Lardner LLP

(57) ABSTRACT

A refuse vehicle has a chassis supporting a plurality of wheels, as well as a motor. A vehicle body is also supported by the chassis and defines a receptacle for storing refuse. A lifting system is coupled to the vehicle body and is movable between a first position and a second position vertically offset from the first position. The refuse vehicle also has a processing unit in communication with the lifting system and the motor. The processing unit is configured to access and toggle through a plurality of preset operational modes stored within a memory to adjust performance parameters of the refuse vehicle.

19 Claims, 5 Drawing Sheets

(51) Int. Cl.
  *G06F 3/04817* (2022.01)
  *G06F 3/0482* (2013.01)
  *B62D 33/04* (2006.01)
  *B62D 21/02* (2006.01)
  *E05F 15/70* (2015.01)
  *B60P 1/50* (2006.01)

(56) References Cited

U.S. PATENT DOCUMENTS

| | | | |
|---|---|---|---|
| 6,066,194 A * | 5/2000 | Hugghins | B03C 3/36 |
| | | | 96/397 |
| 6,266,598 B1 | 7/2001 | Pillar et al. | |
| 6,421,593 B1 | 7/2002 | Kempen et al. | |
| 6,553,290 B1 | 4/2003 | Pillar | |
| 6,757,597 B2 | 6/2004 | Yakes et al. | |
| 6,885,920 B2 | 4/2005 | Yakes et al. | |
| 6,909,944 B2 | 6/2005 | Pillar et al. | |
| 6,922,615 B2 | 7/2005 | Pillar et al. | |
| 6,993,421 B2 | 1/2006 | Pillar et al. | |
| 7,006,902 B2 | 2/2006 | Archer et al. | |
| 7,024,296 B2 | 4/2006 | Squires et al. | |
| 7,072,745 B2 | 7/2006 | Pillar et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,254,468 B2 | 8/2007 | Pillar et al. | |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,392,122 B2 | 6/2008 | Pillar et al. | |
| 7,522,979 B2 | 4/2009 | Pillar | |
| 7,555,369 B2 | 6/2009 | Pillar et al. | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,756,621 B2 | 7/2010 | Pillar et al. | |
| 7,831,363 B2 | 11/2010 | Quigley | |
| 8,095,247 B2 | 1/2012 | Pillar et al. | |
| 9,062,983 B2 | 6/2015 | Zych | |
| 10,414,067 B2 | 9/2019 | Datema et al. | |
| 10,414,385 B2 | 9/2019 | Linsmeier et al. | |
| 11,373,536 B1 * | 6/2022 | Savchenko | G01S 19/42 |
| 2018/0250847 A1 | 9/2018 | Wurtz et al. | |
| 2019/0091890 A1 | 3/2019 | Rocholl et al. | |
| 2019/0121353 A1 | 4/2019 | Datema et al. | |
| 2019/0193934 A1 | 6/2019 | Rocholl et al. | |
| 2019/0291711 A1 | 9/2019 | Shukla et al. | |
| 2019/0325220 A1 | 10/2019 | Wildgrube et al. | |
| 2020/0078986 A1 | 3/2020 | Clifton et al. | |
| 2020/0262366 A1 | 8/2020 | Wildgrube et al. | |
| 2020/0265656 A1 | 8/2020 | Koga et al. | |
| 2020/0339346 A1 * | 10/2020 | Maroney | B25J 13/088 |

FOREIGN PATENT DOCUMENTS

| | | | | |
|---|---|---|---|---|
| EP | 3124404 A1 * | 2/2017 | | A47L 11/00 |
| WO | WO-2004/094269 A1 | 11/2004 | | |

* cited by examiner

OPERATIONAL MODES FOR A REFUSE VEHICLE

CROSS-REFERENCE TO RELATED APPLICATION

This application claims priority to U.S. Provisional Patent Application No. 62/840,974, filed Apr. 30, 2019, the content of which is hereby incorporated by reference in its entirety.

BACKGROUND

Refuse vehicles have many different uses, configurations, and applications. Vehicle operators can perform a variety of different tasks using different controls on the vehicle. Because refuse vehicles are designed to accomplish many different tasks, certain components on the vehicle may be useful in performing some operations, but not helpful for performing others.

SUMMARY

One exemplary embodiment relates to a refuse vehicle. The refuse vehicle has a chassis supporting a plurality of wheels, a motor supported by the chassis, a vehicle body, a lifting system, a processing unit, and a graphical user interface (GUI). The vehicle body is supported by the chassis and defines a receptacle for storing refuse. The lifting system is movable between a first position (e.g., stowed and lowered) and a second position (e.g., deployed and raised) vertically offset from the first position. The processing unit is in communication with the lifting system and the motor and is configured to access and toggle through a plurality of preset operational modes stores within a memory to adjust performance parameters of at least one of the motor and lifting system. The GUI is in communication with the processing unit and is configured to display a plurality of inputs. Each of the plurality of inputs corresponds to a preset operational mode. Upon receiving a selection of one of the inputs on the GUI, the processing unit adjusts the performance parameters of at least one of the motor and lifting system to values associated with the operational mode that is associated with the at least one of the plurality of inputs selected.

Another exemplary embodiment relates to a method of controlling a refuse vehicle. The method includes receiving a selection of a preset operational mode of the refuse vehicle. The method further includes accessing a memory, with a processing unit in communication with a lifting system and a motor of the refuse vehicle, to retrieve preset performance parameters of the refuse vehicle associated with the selected preset operational mode of the refuse vehicle. The performance parameters include a compactor frequency and a compacting force delivered by a compactor within a receptacle of the refuse vehicle. The method further includes adjusting current performance parameters of the refuse vehicle to equal the preset performance parameters associated with the selected preset operational mode of the refuse vehicle.

Another exemplary embodiment relates to a refuse vehicle. The refuse vehicle has a chassis supporting a plurality of wheels, a motor supported by the chassis, a vehicle body, a lifting system, a processing unit, and a graphical user interface (GUI). The vehicle body is supported by the chassis and defines a receptacle for storing refuse. The lifting system is movable between a first position (e.g., stowed and lowered) and a second position (e.g., deployed and raised) vertically offset from the first position. The processing unit is in communication with the lifting system and the motor and is configured to access and toggle through a plurality of preset operational modes stores within a memory to adjust performance parameters of at least one of the motor and lifting system. The GUI is in communication with the processing unit and is configured to display a plurality of inputs. Each of the plurality of inputs corresponds to a preset operational mode. The preset operational modes include at least a recycling mode, a garbage mode, a residential mode, and a commercial mode. Upon receiving a selection of one of the recycling mode and the garbage mode on the graphical user interface, the graphical user interface prompts the selection of one of the residential mode and the commercial mode. Upon receiving a selection of at least one of the residential mode and the commercial mode on the graphical user interface, the processing unit adjusts the performance parameters of at least one of the motor and lifting system to values associated with the at least two preset operational modes selected.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for controlling a refuse vehicle, such as a front loader, side loader, or rear loader. Specifically, refuse vehicles can be controlled using a variety of different and selectable preset operational modes that are optimized to help a refuse vehicle perform different tasks more efficiently.

Different operational modes can be assigned depending on the type of collection route (e.g., recycling or garbage, residential or commercial), type of fuel source being used (e.g., diesel fuel or compressed natural gas), ambient outdoor temperature, or the presence of another implement (e.g., equipment coupled to a PTO shaft), for example. The different selectable operational modes each provide set values for performance parameters of the vehicle that are chosen to more effectively carry out different tasks that may be assigned to a refuse vehicle. Different operational modes may be best achieved using different motor requirements, lifting system requirements, on-board compactor requirements, or other subsystem adjustments that can be executed by a processing system to ensure a more streamlined completion of a desired task. The different operational modes can be selected by a user, by an off-site fleet command center, or automatically implemented by an on-board processing unit and carried out through the completion of an assigned task. For example, an onboard global positioning system (GPS) can monitor the current location of the refuse vehicle and toggle through different operational modes depending on where the refuse vehicle is traveling. Each operational mode can be designed to reduce the amount of manual interaction between an operator and the refuse vehicle during operation, which may further limit mistakes and lost time during operation.

Figure 1:
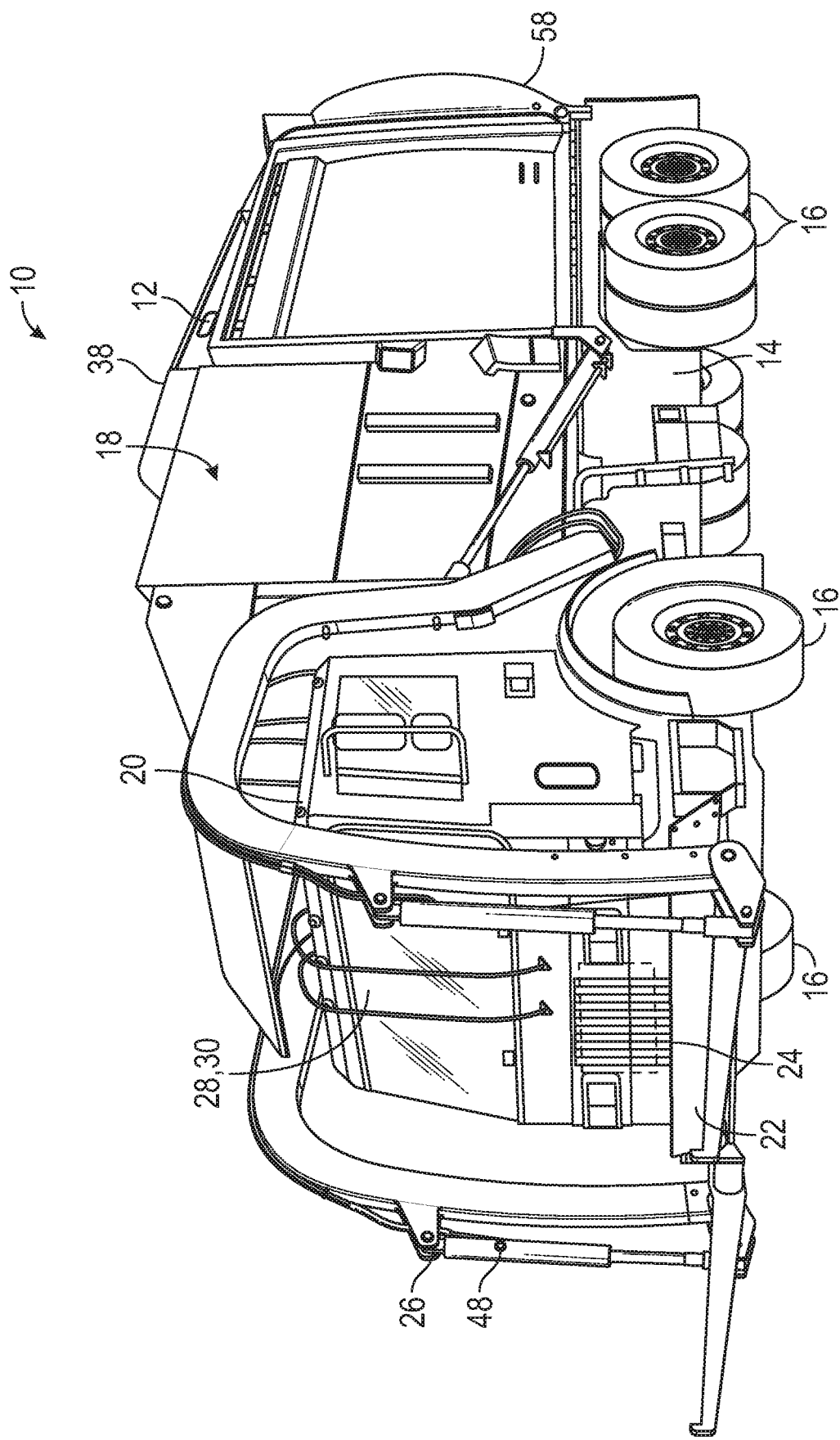
FIG. 1 is a perspective view of a refuse vehicle, according to an exemplary embodiment.

Referring to FIG. 1, a refuse vehicle 10 is adapted for retrieving and hauling refuse from waste containers. The refuse vehicle 10 is depicted as a front end loader 10, but can also take the form of a rear end loader or side loader, for example, that is arranged to lift and transfer contents of a waste container into an on-board receptacle 12. The refuse vehicle 10 has a vehicle chassis 14 that generally supports wheels 16, a vehicle body 18, and the receptacle 12. The vehicle body 18 can include a cab 20 and a motor housing 22 that receives a motor 24. The motor 24 can produce rotational power that can then be transmitted to the wheels 16 through a transmission to drive the refuse vehicle 10.

The on-board receptacle 12 can be sized to receive the contents of several waste containers (e.g., dumpsters, bins, refuse containers, etc.) so that the refuse vehicle 10 can execute an extended route that includes several stops. Upon arriving at each site, a lifting system 26 (e.g., a hydraulic arm assembly) can engage and raise a waste container until an opening of the waste container is inverted or angled downward toward the on-board receptacle 12. Aided by gravity, waste falls out of the opening of the waste container and into the on-board receptacle 12. The waste container can then be lowered to the ground and disengaged from the lifting system 26 so that the refuse vehicle 10 can drive to another location along its route and repeat the waste removal process.

A control system 28 can be positioned within the cab 20 of the vehicle 10, for example, to aid a driver in performing different vehicle tasks. The control system 28 can provide operating instructions to various vehicle subsystems 44, including a steering system, the lifting system 26, a waste compactor 46 (shown in FIG. 5) present within the on-board receptacle 12, a power take-off (PTO) shaft, the motor 24, cab climate controls, and/or other adjustable systems aboard the refuse vehicle 10. A processing unit 30 can issue instructions or commands to each system within the vehicle 10 to execute desired vehicle functions.

With additional reference to FIGS. 2-5, an operator can interact with the control system 28 through a display 32 in communication with the processing unit 30. The display 32 can present a graphical user interface (GUI) 34 that allows a user to monitor operational parameters of the vehicle 10 as well as input commands to the various vehicle subsystems 44. The display 32 can be a touch screen display or can be accompanied by a plurality of inputs (e.g., buttons, joysticks) that can be used to toggle through and select a desired input 42 on the GUI 34.

Using the control system 28 and processing unit 30, the refuse vehicle 10 can be operated in different preset operation modes to more efficiently complete different tasks that may be assigned to the refuse vehicle 10. Each operation mode can include a series of stored system configurations or performance parameters that are optimized for the specific vehicle or the specific task to be performed. The preset operation mode and associated performance parameters can be stored within and accessed from a memory 36 (e.g., local or remote) that is in communication with the processing unit 30.

Figure 2:
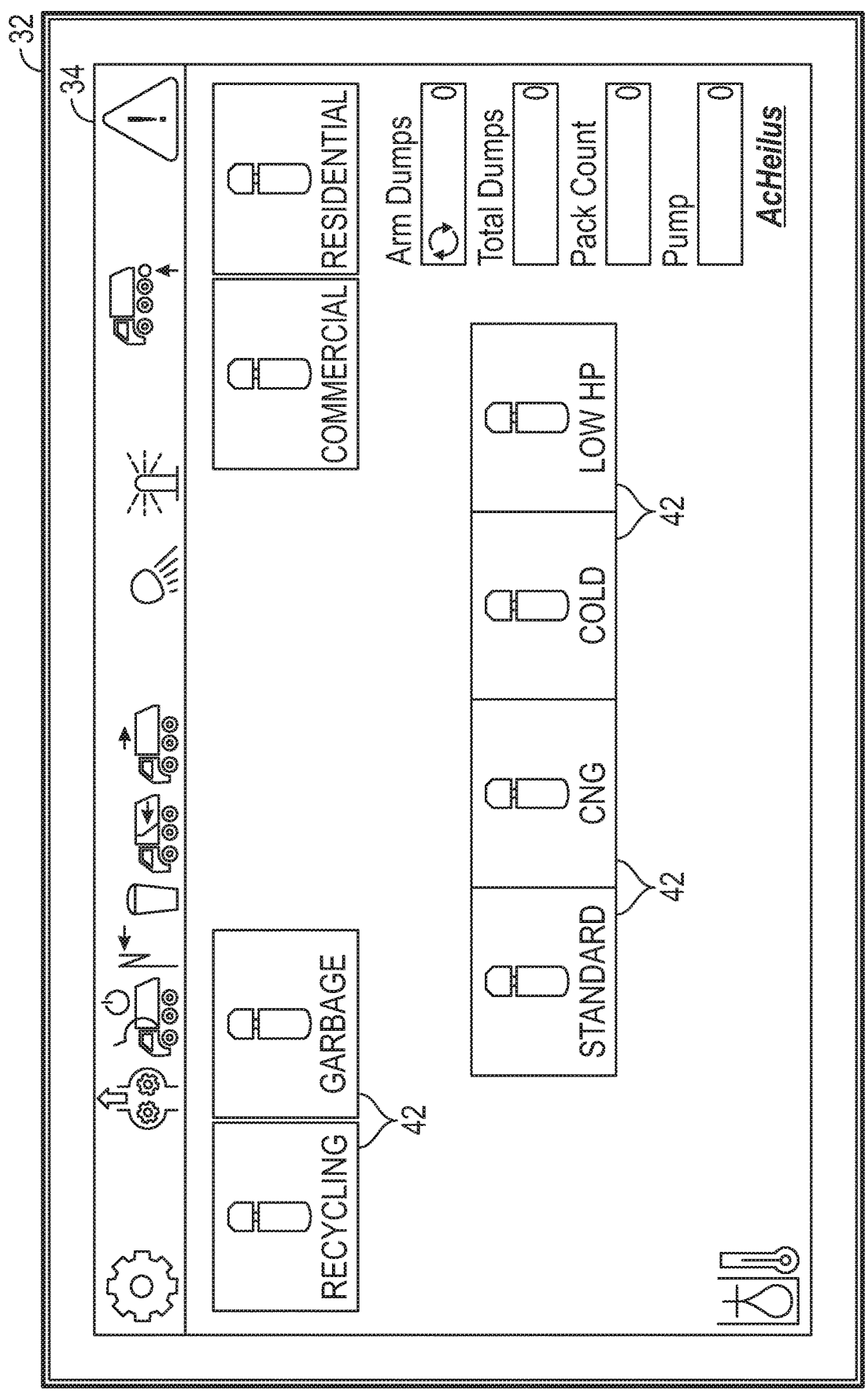
FIG. 2 is a pictorial view of a user interface that can be presented on a display of the refuse vehicle of FIG. 1, depicting several selectable operational mode presets.
Figure 3A:
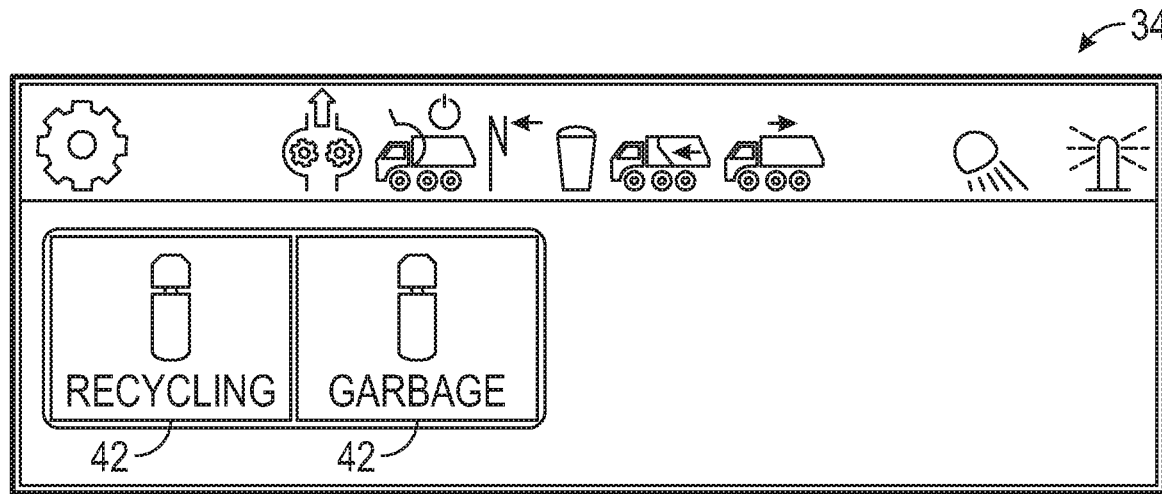
FIG. 3A is a detail view of the graphical user interface of FIG. 2, depicting exemplary operational presets related to materials.

The same refuse vehicle 10 may be used to collect and transport different types of waste, and the preferred collection process may vary by waste type. As shown in FIGS. 2 and 3A, the same refuse vehicle 10 may be used to handle either recycling or garbage, and the preferred operational mode changes depending on the selection. Before beginning a route or driving the refuse vehicle 10, a user may first be prompted by the GUI 34 to select the type of waste to be collected. Using inputs in communication with the display 32 or the display itself (e.g., a touch screen display), a vehicle operator can then select an icon on the GUI 34 that represents the proper waste material type. Alternatively, the type of waste to be collected can be determined automatically based upon the day of refuse vehicle 10 operation (e.g., if there are designated recycling and garbage collection days). In some embodiments, the type of waste to be collected can be input remotely from a fleet command center 56 or network computer in communication with the control system 28 of the refuse vehicle 10. In other examples, the type of material being collected can be determined based upon characteristics (e.g., size, color, shape) of the waste container being accessed, determined by a sensor 48.

Selecting the "garbage" input or the "recycling" input (or another type of waste input, such as organic material) from the GUI 34 adjusts the operation mode of the refuse vehicle 10 to effectively deal with each different type of waste properly. If the recycling input is selected on the GUI 34, the processing unit 30 can access a memory 36 storing specific performance parameters preset for performing a recycling route. For example, the rate at which a compactor 46 or packer within the on-board receptacle 12 operates can be included within the performance parameters associated with the recycling operation mode. Recycling materials are generally lightweight and loosely packed (or entirely unpacked) materials and are advantageously compacted frequently to improve the overall capacity of the on-board receptacle 12 on the vehicle 10, so the rate at which the packer operates can be increased in the recycling operation mode. The position and control mechanism of a top door 38 of the on-board receptacle 12 can be adjusted based upon the selected operation mode as well. Because recycling materials may be lightweight (e.g., cardboard), the recycling materials are often prone to blowing out of the on-board receptacle 12. To contain the collected waste material, the recycling operation mode can include executable instructions that control the processing unit 30 to close the top door 38 at all times when the vehicle 10 is traveling. In some examples, the processing unit 30 controls the top door 38 to be closed whenever the transmission is in gear (e.g., a clutch of the refuse vehicle 10 is engaged to move the vehicle forward or in reverse). The top door 38 can be further configured to automatically open whenever the arm or forks of the lifting system 26 are moved. Allowable capacity for the on-board receptacle 12 can be stored within the performance parameters as well, as recyclable material may be packed against the top door 38 without a significant risk of damage to the vehicle 10.

Selecting the garbage input on the GUI 34 optimizes the vehicle 10 to pick up and transport garbage. Performance parameters including the packer (compactor 46) frequency, packer force, and top door 38 operation can be adjusted upon selecting the garbage operation mode. In some examples, the packer frequency is reduced compared to the recycling mode. Additionally, the force supplied by the packer can be increased in order to better compact garbage received within the on-board receptacle 12. Finally, because garbage packing against the top door 38 can damage the top door 38, the garbage operation mode can include instructions to keep the top door 38 open at all times, regardless of whether the vehicle 10 is moving and regardless of whether the lifting system 26 is being moved. Each adjusted performance parameters can automate processes that may otherwise need to be performed manually by a user, which can help avoid any mistakes during operation due to improper operation or failure to perform certain tasks.

Figure 3B:
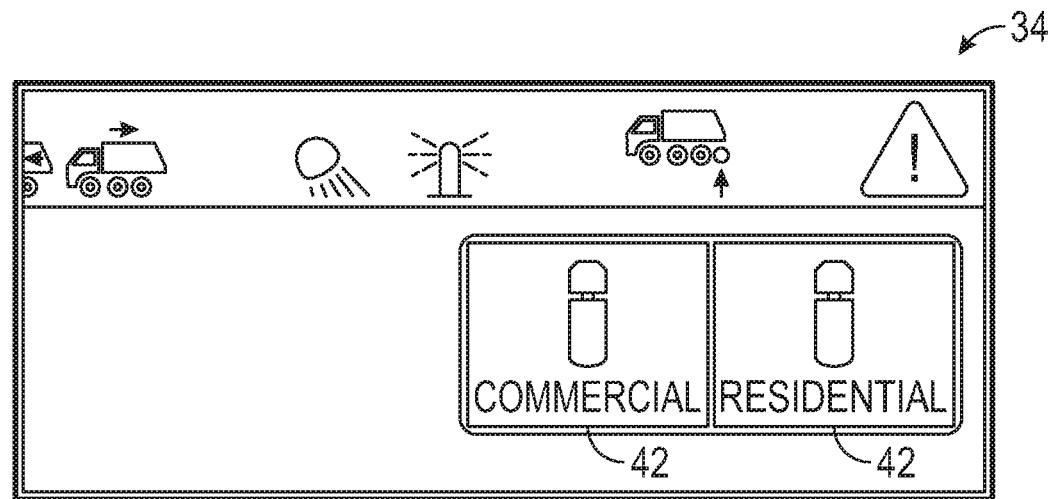
FIG. 3B is a detail view of the graphical user interface of FIG. 2, depicting exemplary operational presets related to refuse receptacle type.

Once a waste material operational mode has been selected on the GUI 34, an operator may be prompted to select a route type. For example, and as shown in FIGS. 2 and 3B, the GUI 34 may ask an operator to input whether the route will be commercial or residential. The route type may directly affect the quantity, weight, and types of waste collected, so different operational modes are assigned for each type of operation.

Selecting the "residential" icon from the GUI 34 can prompt the processing unit 30 to initiate the residential operation mode. Residential routes typically involve more frequent dumps of less weight, and performance parameters can be tailored to effectively deal with these constraints. For example, the packer cycling rate can be increased in the residential mode to capture the lightweight waste materials and continue pushing them backwards within the on-board receptacle 12. The type of operational mode selected can also determine how or when the packer operates. Because waste containers (e.g., garbage cans) along residential routes are typically positioned in close proximity, the vehicle 10 may need to make frequent stops to complete a route. Accordingly, the packer can be arranged to operate while the vehicle 10 is in gear (e.g., drive or reverse). In some embodiments, the packer may operate only when a service brake or work brake is being applied to the vehicle 10. To maximize efficiency along the residential route, the operator should stay in the cab 20 as much as possible. Various performance parameters of the vehicle can be tailored to encourage or incentivize the operator to remain within the cab 20 of the vehicle 10. For example, the lifting system 26 could be controlled only from within the cab 20 of the vehicle 10, or may require some authentication code or credential in order to operate the lifting system 26 externally. Additionally, the lifting system 26 could be configured to only interact with a certain size or color of waste container in the residential mode, as detected by a sensor 48 on the vehicle.

If the "commercial" mode of operation is selected from the GUI 34 instead, the processing unit 30 can retrieve a set of performance parameters that optimize the vehicle 10 to perform a typically more labor-intensive commercial route. Commercial waste containers are often more spread out, but each individual waste container may contain a larger volume of waste. Because the frequency of waste pickup is reduced, the packer within the on-board receptacle 12 may not need to operate at a high frequency. However, like in the garbage operation mode, the force at which the packer operates may preferably be increased to further compact the waste retrieved from each waste container along the route. Operators may need to get out of the cab 20 of the vehicle 10 to access and retrieve commercial waste containers from fenced areas or corrals, so the vehicle 10 may be parked periodically. The processing unit 30 can control the packer to operate when the vehicle 10 is in neutral, for example, and the parking brake is activated.

Selecting either of the residential or commercial routes can also prompt the processing unit 30 to begin measuring or recording data associated with the route. For example, the selection of a residential mode may then present a menu of stored past residential routes performed by the vehicle 10 (or a different vehicle within the fleet) on the GUI 34. The operator can select a route from the GUI 34 associated with the desired route (or choose to start a new route) and the display 32 can present a GPS map indicating the location of various stops along the route or a map, generally, of the surrounding area. As the vehicle 10 navigates the route and collects waste from each location, sensors 48 positioned throughout the vehicle 10 can record data. For example, sensors 48 positioned on the lifting system 26 can measure the weight of waste retrieved from each location. Once paired with a GPS coordinate, a customer at a specific address can be charged based upon the amount of waste collected at the site. For commercial routes, a customer could be charged based upon the amount of time spent at a location collecting waste materials. Additional data, including whether or not any waste containers were found present at a designated pickup location can be stored within the memory 36 as well.

Figure 3C:
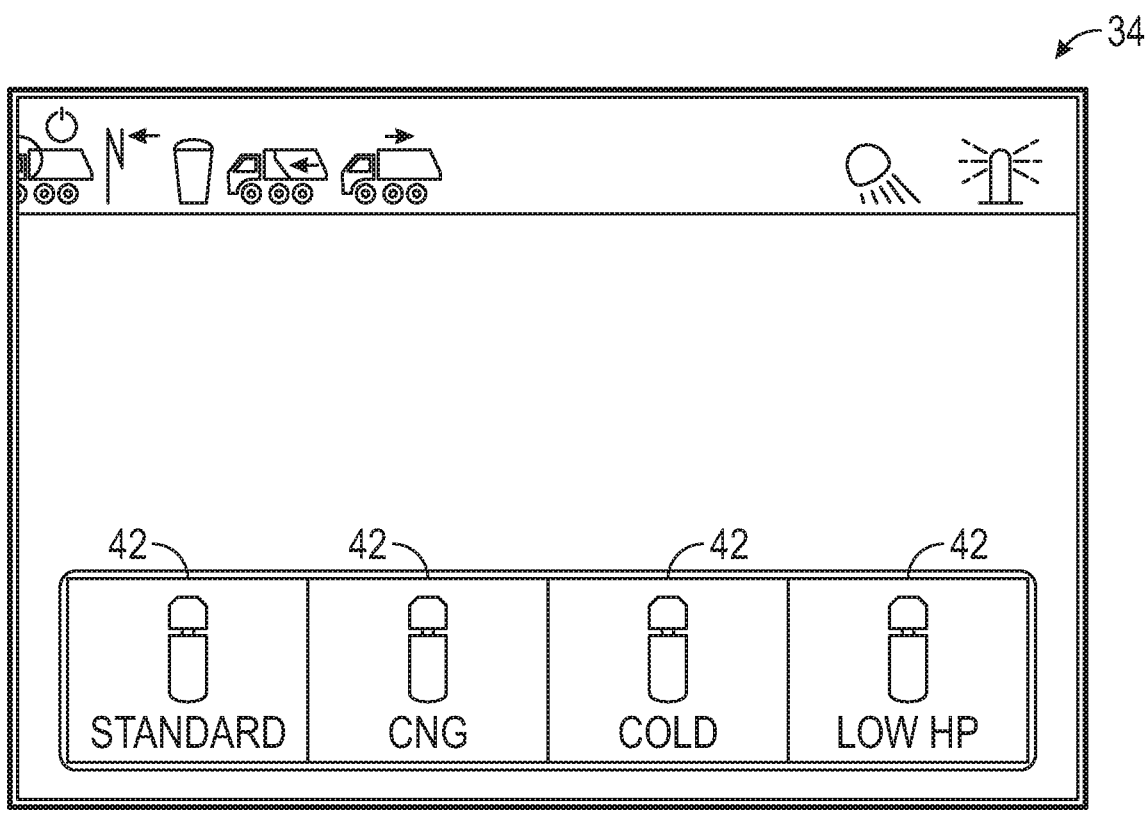
FIG. 3C is a detail view of the graphical user interface of FIG. 2, depicting exemplary operational presets related to overall vehicle system performance.

The GUI 34 can also display several different system operation modes that may advantageously activate or modify the operation of different vehicle subsystems 44 to optimize vehicle 10 performance. As shown in FIGS. 2 and 3C, an array of selectable inputs 42 can be presented on the display 32 that correspond with conditions the vehicle 10 may need to operate under. For example, the vehicle 10 may need to accommodate for specific performance parameters including hydraulic fluid temperature, transmission type, fuel type, ambient temperature, engine size, or other variable characteristics of a refuse vehicle 10. An operator can manually select an input on the GUI 34 to transition to a new operational mode or an operational mode can be automatically selected by the processing unit 30. For example, a temperature sensor 48 may be positioned on the vehicle 10 and may communicate temperature readings to the processing unit 30. If the detected temperature is below a threshold value (e.g., −10 degrees C.), the processing unit 30 can initiate a "cold" operation mode. In some embodiments, a remote fleet manager could select a suitable operation mode for the vehicle 10.

Different operation modes can be provided for each possible type of fuel that can power the refuse vehicle 10. For example, the GUI 34 can present selectable inputs for "standard," "CNG," "electric," or other suitable fuel sources. The standard input can correspond with a standard-sized diesel fuel engine that is operating within an acceptable range of ambient temperatures. In the standard mode of operation stored within the memory 36, performance parameters related to vehicle subsystems 44 can be adjusted so that all subsystems 44 are operational. The vehicle 10, lift system 26, motor 24, and compactor 46 can all be provided with full power to exhibit peak performance. Vehicle subsystems 44 do not require a throttle advance in this mode.

Some refuse vehicles 10 can be configured to run on compressed natural gas (CNG) as well, and can have a dedicated operational mode for this alternative fuel source. The GUI 34 can provide a selectable "CNG" input that can be implemented by the processing unit 30. The processing unit 30 can be in communication with the motor 24, a fuel pump or injector (not shown), and/or the fuel source itself to transition the motor 24 from receiving diesel fuel over to a mixture of diesel and CNG, or CNG alone. Beyond the motor 24 and fuel supply, other performance parameters of the vehicle may be adjusted to optimize the vehicle 10 for operating with alternative fuel sources. Ramping may be applied to certain functions of the vehicle to accommodate the process of how the motor 24 handles fuel. Because CNG engines are slower to respond to changes in engine load (e.g., throttle input), overshoot and stalling conditions may occur under normal operating conditions. The processing unit 30 can automatically execute a throttle advance to perform functions that may require an increase in torque. For example, the amount of CNG supplied to the motor 24 can be increased before and during the process of opening and closing the tailgate 58 of the vehicle 10. In some examples, one or more of the vehicle subsystems 44 are operated below rated capacity when the vehicle 10 is in the CNG operational mode. For example, one or more hydraulic fluid pumps can be deactivated to accommodate for the lower torque available from the motor 24. The processing unit 30 can increase the idle rotational speed of the engine to help provide additional torque while the vehicle is stationary. In some examples, the CNG operational mode can be used to provide rotational power to an external shaft or implement. A power take-off (PTO) shaft (not shown) can be controlled using the GUI 34 and processing unit 30 in the CNG mode.

Like the CNG operational mode, the "cold" mode can include modified performance parameters arranged to operate the refuse vehicle 10 at less than full capacity. For example, when the refuse vehicle 10 is being operated in ambient temperatures at or below 0 degrees C., certain vehicle subsystems 44 may be limited or otherwise reassigned. Function settings, ramps, and/or pump operation can be limited. Certain subsystems 44 can be dead-headed to produce heat that can be used to help the pumps or other hydraulics properly operate. In some embodiments, heaters (not shown) may be positioned about the vehicle 10 to supply heat to various locations within the hydraulic fluid flow path or within the hydraulic fluid reservoir. Sensors 48 within the hydraulic fluid reservoir can monitor the temperature of the hydraulic fluid contained within the reservoir, and can communicate with the processing unit 30 to operate the heaters (or dead head other functions to provide heat) when a detected hydraulic fluid temperature is below a threshold value. In some embodiments, the cold operational mode can be initiated by the processing unit 30 automatically when sensors detect hydraulic fluid temperature below a set threshold value or ambient temperature below a set threshold value.

The GUI 34 can also display a selectable icon for a low horsepower or "low HP" mode. The low horsepower mode can include performance parameters that are optimized to operate the vehicle 10 when the engine is capable of producing less than maximum power. Various factors may contribute to vehicle performance, including engine size and transmission type. With less available power, one or more of the vehicle subsystems 44 can be operated below rated capacity. Like the CNG mode, one or more hydraulic fluid pumps can be deactivated to accommodate for the lower torque available from the motor 24. The processing unit 30 can increase the idle rotational speed of the engine to help provide additional torque while the vehicle is stationary. The low horsepower operational mode can also be used to provide rotational power to an external shaft or implement. A PTO shaft (not shown) can also be controlled using the GUI 34 and processing unit 30 in the low horsepower mode.

Figure 4:
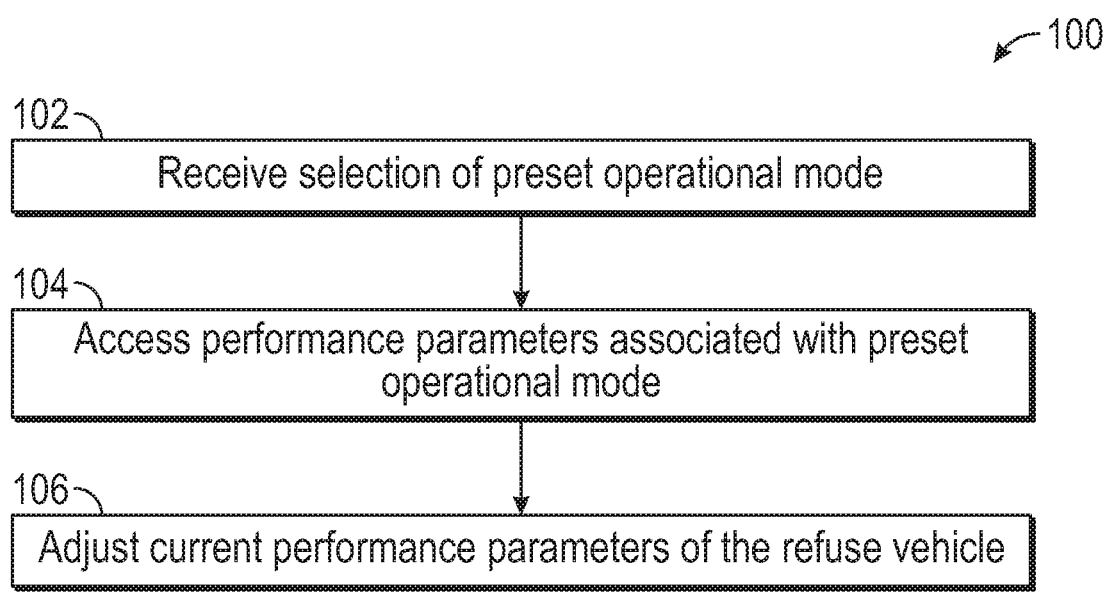
FIG. 4 is a process diagram of a method for controlling a refuse vehicle, according to an exemplary embodiment.

A method 100 of controlling a refuse vehicle 10 can be performed using the GUI 34 and processing unit 30, as detailed in FIG. 4. At step 102, a processing unit like the processing unit 30 can receive a selection of a preset operational mode. The selection of a preset operational mode can be made by an operator within the vehicle 10, automatically based upon detected vehicle parameters (e.g., temperature, fuel source, engine size), or remotely. For example, a fleet command center can provide instructions, including a preset operational mode, to each refuse vehicle 10 within its command.

Alternatively, the selection of a present operational mode at step 102 can be generated by the processing unit 30. The processing unit 30, which can be in communication with an onboard GPS. The GPS, which can be included within the sensors 48 of the control system 28, monitors the location of the refuse vehicle 10 as the vehicle 10 travels. The memory 36 can store a variety of different geographical indicators, such as "checkpoints" or geo-fences, which can be periodically compared with the current location of the refuse vehicle 10. If the refuse vehicle 10 crosses a stored geo-fence or reaches a checkpoint, for example, the processing unit 30 can transition the refuse vehicle 10 into a different operational mode. When the truck initially leaves to travel along a route, the processing unit 30 can compare the location of the refuse vehicle 10 to route maps or data stored within the memory 36. If the processing unit 30 determines that the location of the refuse vehicle 10 (or the recent path traveled by the refuse vehicle 10) matches a stored map location or route within the memory 36, the processing unit 30 can generate a selection to transition the refuse vehicle 10 to a different operational mode. For example, if the refuse vehicle 10 travels along a stored pick-up route for a predetermined distance (e.g., 800 meters), the processing unit 30 recognizes that the refuse vehicle 10 is traveling along a stored residential route and issues a selection of the residential operation mode. Alternatively, if the refuse vehicle 10 travels a predetermined distance (e.g., 1600 meters) without recognizing a stored checkpoint or pick-up route, the processing unit 30 can automatically select the commercial operation mode. Geo-fences can be positioned around residential areas, for example, which cause the processing unit 30 to select the residential operation mode whenever the refuse vehicle 10 passes beyond the geo-fence. The same route-recognition by the processing unit 30 and GPS can be applied to recycling and garbage modes as well.

At step 104, the processing unit can access performance parameters associated with the selected preset operational mode. As discussed previously, each preset operational mode optimizes the refuse vehicle 10 in a different way, based upon the tasks to be accomplished, the surrounding environmental conditions, or motor operation. The optimized performance parameters for each operational mode can be stored within a memory (e.g., memory 36) that can be accessed by the processing unit. The memory can be local or remote (e.g., cloud-based or network-based). The performance parameters may include packer frequency and pressure/force, hydraulic pump operation, heater operation, receptacle top door operation, vehicle subsystem operational levels and operational logic, sensor operation, and/or performance of other controllable or variable components on a refuse vehicle.

At step 106, the processing unit adjusts current performance parameters of the refuse vehicle to match the performance parameters accessed at step 104. Adjusting the performance parameters of the vehicle to correspond with the values stored within the memory places the refuse vehicle in the selected preset operational mode chosen at step 102. A GUI can display additional options related to the selected operational mode or data sensed or otherwise received during operation of the refuse vehicle within the selected operational mode, for example. The refuse vehicle is then optimized to perform a specific task or perform within a specific set of operational constraints.

Figure 5:
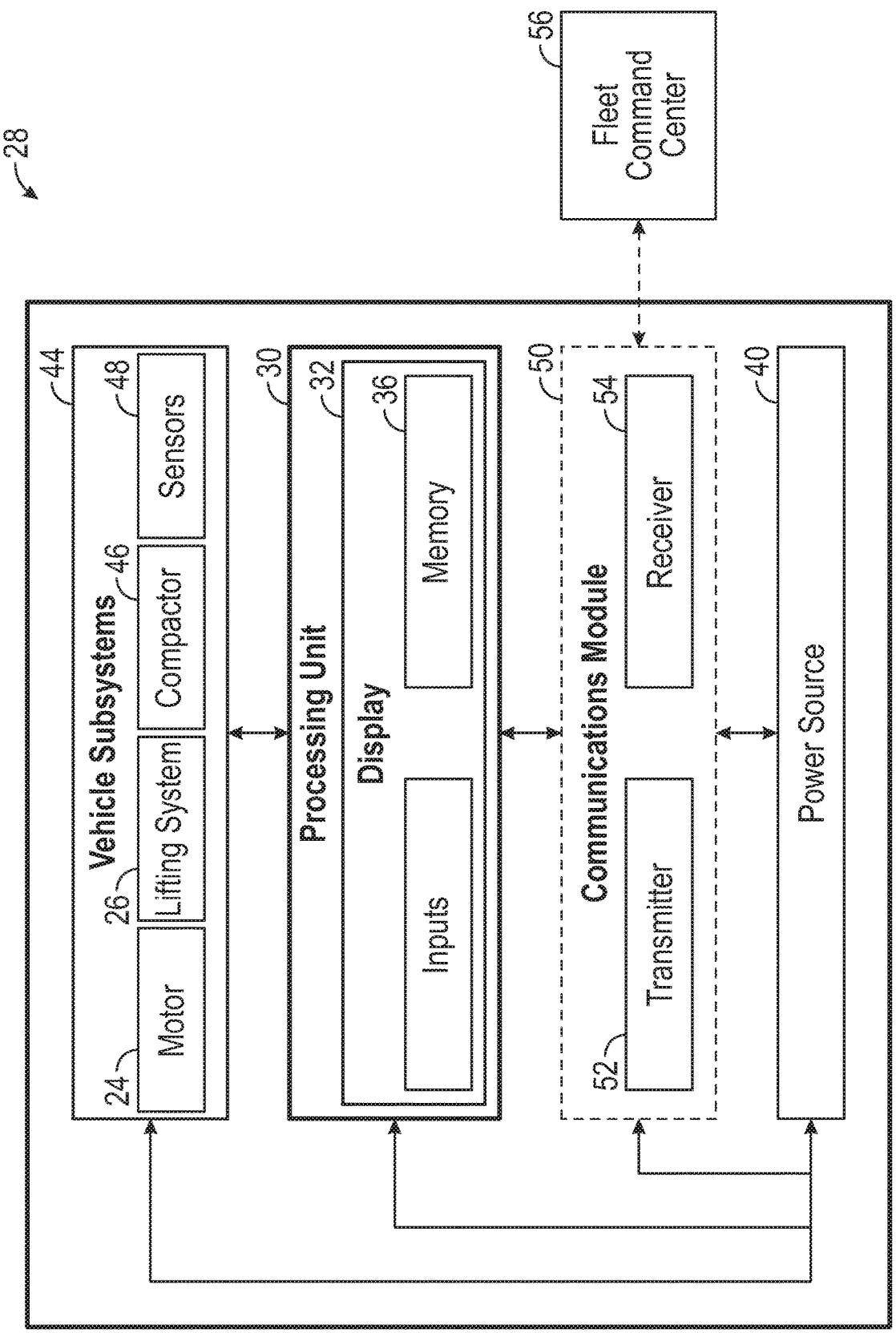
FIG. 5 is a schematic diagram of components that can be incorporated into a refuse vehicle, according to an exemplary embodiment.

The control system 28 can be organized as shown in FIG. 5. An on-board power source 40 (e.g., a battery) can provide electrical power to each of the components within the control system 28. As discussed previously, the control system 28 includes a processing unit 30. The processing unit 30 can be coupled to the display 32 to present the GUI 34. Inputs 42 in communication with the display 32 and processing unit 30 can be used to interact with the GUI 34. Memory 36 can be stored on-board the vehicle 10 or remotely, but is in communication with and accessible by the processing unit 28.

The processing unit 28 issues commands and instructions to the vehicle subsystems 44 positioned about the vehicle. The vehicle subsystems 44 may include the motor 24, the lifting system 26, the compactor 46, sensors 48 positioned about the refuse vehicle 10, or other suitably controlled aspects of the refuse vehicle 10. Each subsystem 44 can be powered by the power source 40 and operated using the inputs 42, which may include a steering wheel, throttle, joystick, buttons, or the like.

In some embodiments, the control system 28 includes a communications module 50 to send and receive data from an external source. For example, the communications module 50 may include a transmitter 52 that can communicate with an external computer (e.g., a fleet command center 56) or a network to send data related to the vehicle operational modes or performance. The communications module 50 can further include a receiver 54 that can communicate with an external computer or network to receive instructions, data, updated operational modes and performance parameters, and other data that may advantageously be used to operate the refuse vehicle 10. Using the communications module 50, a refuse vehicle 10 can be remotely controlled or monitored to ensure optimized performance is occurring.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:
a chassis supporting a plurality of wheels;
a motor supported by the chassis;
a vehicle body supported by the chassis and defining a receptacle for storing refuse therein;
a lifting system movable between a first position and a second position vertically offset from the first position;
a processing unit in communication with the lifting system and motor and configured to access and toggle through a plurality of preset operational modes stored within a memory to adjust performance parameters of at least one of the motor and lifting system,
wherein the plurality of preset operational modes include a recycling mode and a garbage mode, the recycling mode being different than the garbage mode; and
a graphical user interface in communication with the processing unit and configured to display a plurality of inputs, each of the plurality of inputs corresponding to one of the preset operational modes;
wherein upon receiving a selection of one of the plurality of inputs on the graphical user interface, the processing unit adjusts the performance parameters of at least one of the motor and lifting system to values associated with the preset operational mode associated with the at least one of the plurality of inputs selected.

2. The refuse vehicle of claim 1, wherein when the refuse vehicle is in the recycling mode, the processing unit controls a compactor within the receptacle to operate at a first frequency and wherein when the refuse vehicle is in the garbage mode, the processing unit controls the compactor to operate at a second frequency lower than the first frequency.

3. The refuse vehicle of claim 2, wherein when the refuse vehicle is in the recycling mode, the processing unit controls the compactor within the receptacle to operate at a first compacting force and wherein when the refuse vehicle is in the garbage mode, the processing unit controls the compactor to operate at a second compacting force higher than the first compacting force.

4. The refuse vehicle of claim 1, wherein in the recycling mode, the processing unit controls a top door extending across the receptacle to transition between an open position and a closed position, and wherein in the closed position, the receptacle is sealed off from an external environment.

5. The refuse vehicle of claim 4, wherein the processing unit controls the top door so that the top door is in the closed position whenever the refuse vehicle is traveling.

6. The refuse vehicle of claim 5, wherein the processing unit controls the top door so that the top door transitions to the open position when the lifting system transitions away from the first position.

7. The refuse vehicle of claim 4, wherein in the garbage mode, the processing unit controls the top door to remain in the open position when the refuse vehicle is traveling.

8. The refuse vehicle of claim 7, wherein in the garbage mode, the processing unit controls the top door to remain in the open position when the refuse vehicle is stationary.

9. The refuse vehicle of claim 1, wherein the plurality of preset operational modes further includes a residential mode and a commercial mode, the residential mode being different than the commercial mode.

10. The refuse vehicle of claim 9, wherein when the refuse vehicle is in the residential mode, the processing unit controls a compactor within the receptacle to operate at a first frequency and wherein when the refuse vehicle is in the commercial mode, the processing unit controls the compactor to operate at a second frequency lower than the first frequency.

11. The refuse vehicle of claim 10, wherein when the refuse vehicle is in the residential mode, the processing unit controls the compactor within the receptacle to operate upon receiving an indication that the refuse vehicle is in gear.

12. The refuse vehicle of claim 10, wherein when the refuse vehicle is in the residential mode, the processing unit controls the compactor within the receptacle to operate upon receiving an indication that a service brake of the refuse vehicle is engaged.

13. The refuse vehicle of claim 9, wherein when the refuse vehicle is in the residential mode, the processing unit communicates with the memory and retrieves a residential route stored therein, the residential route being displayed on the graphical user interface and including a global positioning system map indicating locations of a plurality of pickup locations along the residential route.

14. The refuse vehicle of claim 13, wherein as the refuse vehicle travels along the residential route displayed on the graphical user interface, a sensor coupled to the receptacle measures a mass of refuse collected from at least one of the plurality of pickup locations, communicates the measured mass of refuse collected at the at least one pickup location to the processing unit, and the processing unit communicates and controls the memory to store the measured mass of refuse and an associated indication of the pickup location.

15. A method of controlling a refuse vehicle, comprising:
receiving a selection of a preset operational mode of the refuse vehicle;
accessing a memory, with a processing unit in communication with a lifting system and a motor of the refuse vehicle, to retrieve preset performance parameters of the refuse vehicle associated with the selected preset operational mode of the refuse vehicle, the performance parameters including a compactor frequency and a compacting force delivered by a compactor within a receptacle of the refuse vehicle; and
adjusting current performance parameters of the refuse vehicle to equal the preset performance parameters associated with the selected preset operational mode of the refuse vehicle,
wherein the memory stores a plurality of preset operational modes, the plurality of preset operational modes including a recycling mode and a garbage mode, the recycling mode being different than the garbage mode.

16. The method of claim 15, wherein in the recycling mode, the processing unit controls the compactor to operate at a first compactor frequency, and wherein in the garbage mode, the processing unit controls the compactor to operate at a second compactor frequency lower than the first compactor frequency.

17. The method of claim 15, wherein the selection of the preset operational mode of the refuse vehicle is received by the processing unit after performing the steps of:
detecting, with a global positioning system, a current location of the refuse vehicle;
comparing, with the processing unit, the current location of the refuse vehicle to at least one geographical indicator stored within the memory; and
accessing the memory, with the processing unit, to retrieve the preset operational mode of the refuse vehicle associated with the at least one geographical indicator upon determining that the current location of the refuse vehicle corresponds to the at least one geographical indicator.

18. The method of claim 15, wherein the memory stores a plurality of preset operational modes, the plurality of preset operational modes including a residential mode, and wherein in the residential mode, the processing unit performs the additional steps of:
accessing, from the memory, a residential route including a global positioning system map indicating a plurality of pickup locations along the residential route;
displaying, on a graphical user interface, the residential route;
determining, with a global positioning system, a current location of the refuse vehicle;

measuring, with a sensor, an amount of refuse collected at the current location of the refuse vehicle; and communicating a command to the memory to store the current location of the refuse vehicle and the measured amount of refuse collected from the current location of the refuse vehicle.

19. A refuse vehicle, comprising:

a chassis supporting a plurality of wheels;

a motor supported by the chassis;

a vehicle body supported by the chassis and defining a receptacle for storing refuse therein;

a lifting system movable between a first position and a second position vertically offset from the first position;

a processing unit in communication with the lifting system and motor and configured to access and toggle through a plurality of preset operational modes stored within a memory to adjust performance parameters of at least one of the motor, the lifting system, or a compactor within a receptacle of the refuse vehicle; and a graphical user interface in communication with the processing unit and configured to display a plurality of inputs, each of the plurality of inputs corresponding to one of the preset operational modes, the preset operational modes including at least a recycling mode, a garbage mode, a residential mode, and a commercial mode, wherein the recycling mode is different than the garbage mode;

wherein upon receiving a selection of one of the recycling mode and the garbage mode on the graphical user interface, the graphical user interface prompts the selection of one of the residential mode and the commercial mode, and wherein upon receiving a selection of at least one of the residential mode and the commercial mode on the graphical user interface, the processing unit adjusts the performance parameters of at least one of the motor and lifting system to values associated with the at least two preset operational modes selected;

wherein in the recycling mode, the processing unit controls the compactor to operate at a first compactor frequency, and wherein in the garbage mode, the processing unit controls the compactor to operate at a second compactor frequency lower than the first compactor frequency.

* * * * *